May 8, 1923.　　　　　　　　　　　　　　　　　　1,454,255
C. H. WEISKOPF
APPARATUS FOR ELECTRICAL PRECIPITATION OF SUSPENDED PARTICLES FROM GASES
Filed April 6, 1921
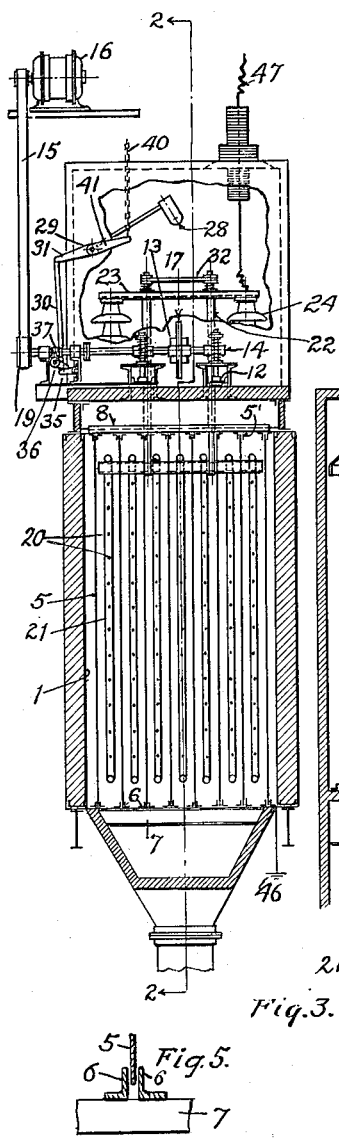
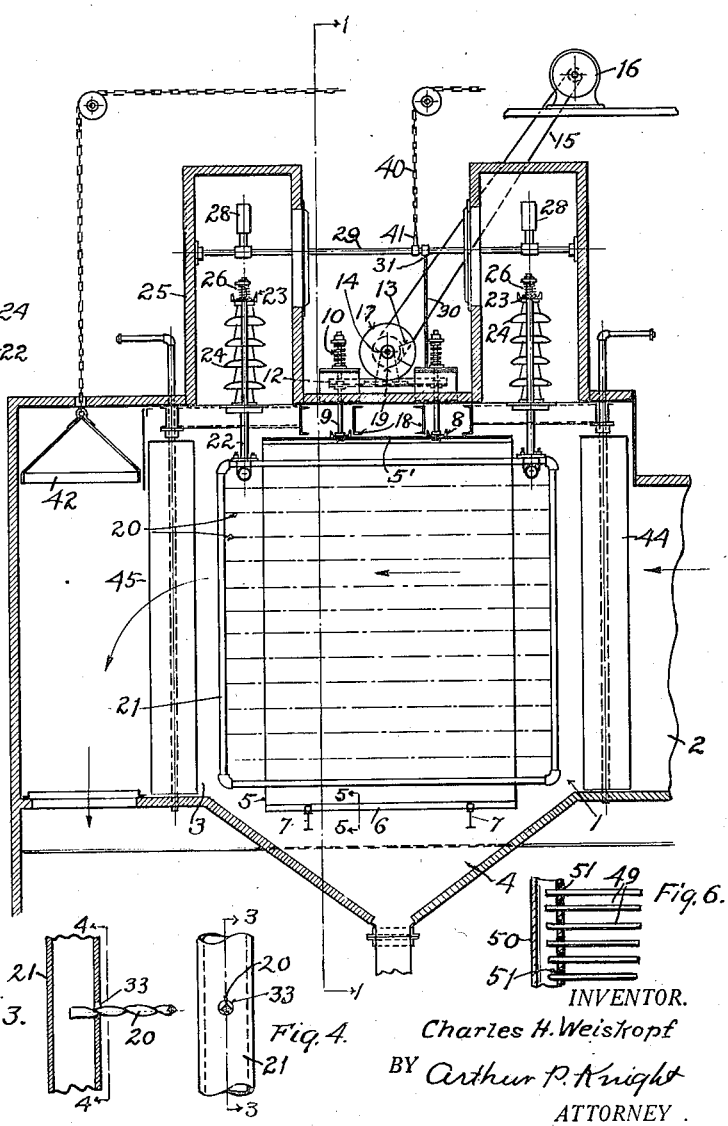
INVENTOR.
Charles H. Weiskopf
BY Arthur P. Knight
ATTORNEY.

Patented May 8, 1923.

1,454,255

UNITED STATES PATENT OFFICE.

CHARLES H. WEISKOPF, OF SANTA MONICA, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

Application filed April 6, 1921. Serial No. 458,922.

*To all whom it may concern:*

Be it known that I, CHARLES H. WEISKOPF, a citizen of the United States, residing at Santa Monica, in the county of Los Angeles and State of California, have invented a new and useful Apparatus for Electrical Precipitation of Suspended Particles from Gases, of which the following is a specification.

This invention relates to electrical precipitating apparatus for subjecting gases to the action of an electrical field to remove smoke, dust, fume, or other suspended material therefrom. Such apparatus in general comprises electrodes, generally referred to as discharge and collecting electrodes, mounted in a flue or chamber through which the gases pass, said electrodes being adapted to subject the gases to the action of an electrical field in such manner as to effect precipitation of suspended material on the electrodes.

The main object of the present invention is to provide improved means for removing from the electrodes the material collected thereon by precipitation from the gases.

The accompanying drawings illustrate embodiments of my invention, and referring thereto:

Fig. 1 is a transverse vertical section of one form of the invention taken on line 1—1 in Fig. 2;

Fig. 2 is a section taken on line 2—2 in Fig. 1;

Fig. 3 is a detailed section of a portion of one of the discharge electrodes and its mounting or supporting means taken on line 3—3 in Fig. 4;

Fig. 4 is a section on line 4—4 in Fig. 3;

Fig. 5 is a detail section on line 5—5 in Fig. 2.

Fig. 6 is a partial vertical section of a modified form of collecting electrode.

The invention shown in the drawings comprises a flue or chamber 1 extending horizontally and having an inlet opening 2 at one end and an outlet opening 3 at the other end and provided at its bottom with a hopper or bin 4 for receiving the precipitated material when it is removed from the electrodes of the precipitator, said bin having the usual outlet means for removing therefrom the collected material.

The precipitator further comprises a series of collecting electrodes 5 and a series of discharge electrodes mounted within the chamber of flue 1, said collecting electrodes being grounded and said discharge electrodes being mounted on suitable insulating means.

The collecting electrodes 5 may consist of plates hung from beams 8 extending transversely with respect to the series of electrodes, the lower ends of said plates extending between fixed guide bars 6 on fixed cross beams 7. The cross beams 8 are preferably supported on spring suspension means, for example, by suspension rods 9 secured to said beams 8 and resting on supporting springs 10, so that the collecting electrodes have a short period of oscillation and can be subjected to a rapid bodily movement or agitation in the manner hereinafter described, in order to effect removal from the electrodes of material collected thereon in the precipitating operation. Such movement or agitation of the collecting electrodes is preferably effected by means of an unbalanced weight 13 on a disk 17 mounted to rotate on a shaft 14 carried by a frame 12 which is secured to the suspension rods 9 aforesaid, or is otherwise in rigid connection with the collecting electrode system consisting of the collecting electrode plates 5 and the supporting beams 8 therefor. Said unbalanced weight has its center of gravity eccentric with respect to said shaft so that rotation of said weight will exert a shaking, jarring or agitating action on the collecting electrode system. The rotatably mounted weight or the pulley carrying the same may be operated in any suitable manner, for example, by means of a belt connection 15 from a motor 16, such belt connection engaging a pulley 19 on the shaft 14 of said unbalanced weight. Stationary beams 18 are mounted above the top bars 5' of the collecting electrode system to act as bumpers therefor.

The discharge electrodes are shown as each comprising horizontal bars or rods 20 constituting discharge electrode elements and being loosely mounted on vertical frames 21, which are hung by suspension rods 22 from horizontal beams 23 mounted on insulators 24 located in insulator boxes 25. Each discharge electrode, consisting of a frame 21 and rods or bars 20 carried thereby, is preferably mounted in such manner as to provide a resilient support therefor, so as to facilitate shaking or jarring of same without injury to the insulators. For this purpose, the suspension rods 22 aforesaid are preferably mounted on springs 26, which rest on the horizontal beams 23 aforesaid. Jarring of the discharge electrode system is preferably effected by means of hammer devices 28 carried by a shaft 29 and adapted to strike impact receiving means consisting of cross beams 32 connected to the suspension rods 22, said hammer devices being operated in any suitable manner, for example, by means of a rod 30 connected to an arm 31 on the shaft 29 and to an arm 35 pivoted to a fixed support and operated by a rotating cam 36, which is operated by gearing 37 from shaft 14 aforesaid. The hammer devices are normally held out of operation and away from the discharge electrode system by means of a chain 40 connected to an arm 41 on shaft 29, said chain being released or slackened by manual operation when the rapping is to be effected.

To increase the effect of the agitation of the discharge electrode in removing therefrom material collected thereon during the precipitating action the rods or bars 20 constituting the discharge electrode elements are preferably loosely mounted on the supporting frame 21 therefor, said rods or bars consisting, for example, of twisted square steel bars passing loosely through openings 33 in the vertical bars of the rectangular frame 21 (see Figs. 3 and 4), so as to provide for a certain amount of play of the bars within said openings and allow the bars to rattle or shake more freely than they would if rigidly mounted and thereby increase the effect of the agitation causing the material collected on the bars to be dislodged therefrom. Said frame 21 is preferably formed as a rectangular frame comprising horizontal and vertical pipes, the openings 33 being formed in one side only of the vertical pipes, the opposite side serving as a stop to limit endwise movement of the loose bars 20.

Suitable damper means, indicated at 42, may be provided for controlling the flow of gases through the precipitator and louvre dampers 44 and 45 may be provided at the respective ends of the precipitator chamber to further control and to equalize the flow of gases therethrough.

The operation of this form of the invention is as follows:

The collecting electrodes 5 are grounded, as indicated at 46, and the discharge electrode system is connected by wire 47 to any suitable source of high tension electric current, preferably unidirectional, so as to maintain or produce between the high tension system and the grounded collecting electrode system a potential difference sufficient to affect the precipitating operation, for example, from 30,000 to 80,000 volts, according to the spacing of the electrodes and the nature of the gases to be treated. The gases to be treated pass through the precipitating chamber 1, as indicated by the arrows, and in passing between the discharge and collecting electrodes are subjected to the electrical field maintained between such electrodes, with the result that suspended material, such as dust, fume, etc., in the gases is precipitated upon the electrodes, such precipitation being mainly on the collecting electrodes, although there is, in general, some material precipitated upon the discharge electrodes. It has been found that the presence of the precipitated material upon the collecting electrodes often leads to serious difficulty in interfering with the efficiency of precipitation and it is, therefore, desirable to maintain these collecting electrodes approximately clean at all times. This is effected according to the present invention by continual shaking or agitation of the collecting electrodes, the collecting electrode system being resiliently mounted preferably upon the springs 10 aforesaid which have a short period of oscillation and adapted to shake or vibrate as a whole upon said support. Such shaking of the collecting electrode system is effected by the operation of the unbalanced weight or pulley 13, which is rotated on its shaft 14 at sufficiently high speed to produce an agitating effect due to the rapid shifting of the weight around its shaft, the reaction due to such operation causing the application of both horizontal and vertical forces to the collecting electrode system. By reason of the manner of support of the collecting electrode system same is adapted to respond freely to the vertical component of these forces and a vertical shaking or agitating effect is thereby produced on the collecting electrodes tending to dislodge deposited material therefrom. In order, however, to ensure effective operation, the bumpers, consisting of beams 18, are provided, against which the top bars 5' of the collecting electrodes strike in the upward movement thereof, so as to give a bumping or jarring action which effectively removes suspended material from the collecting electrode plates. It is obvious that these bumping devices could be located at the bottom or lower end of the plates and, in fact, the plates can be so arranged, as indicated in Fig. 5, that their lower ends will strike the fixed cross beam 7. It is preferable to maintain the above described cleaning means in continuous operation so as to produce a continual jigging or agitating motion of the collecting electrodes and remove the suspended material therefrom as soon as it is precipitated thereon. If desired, however, the motor 16 may be operated intermittently at stated intervals to clean the collecting electrode system from time to time.

The hammer devices 28 for the high tension or discharge electrode system are normally raised, as indicated in Fig. 1, so as to be sufficiently removed from the high tension system to prevent short circuit, and when cleaning of the high tension or discharge electrodes is required the controlling chain 40 is lowered or slackened to allow the hammer devices to be operated by the rotating cam 36 operating through arm 35, rod 30, and arm 31, to repeatedly lift the hammers and then allow them to fall, causing a downward blow to be applied to the cross bars 32, such blow being communicated through the suspension rods 22 to the discharge electrode system, producing a violent jarring action thereon, which effectively removes therefrom any material which may have been deposited thereon. This removal of the suspended material is facilitated by reason of the loose mounting of the discharge electrodes in the supporting frame therefor, as above described, enabling the discharge electrodes to rattle or vibrate more or less independently of their supports and to turn over so as to permit any deposit which may collect on the top of the discharge electrodes to be brought to the under side of said electrodes by partial rotation thereof and to be thereby more readily shaken or jarred from the electrodes. Similar shaking effect may be produced on the collecting electrodes by constructing the same of electrode elements mounted loosely within the supporting frame. For example, as indicated in Fig. 6, the collecting or receiving electrodes may comprise horizontal rods or bars 49 mounted loosely in openings 51 in vertical side bars or pipes 50 in the same manner as above described with reference to Figs. 3 and 4, but so closely spaced as to present substantially the effect of a continuous plane surface with respect to their effect on the electrical field.

When such construction of the electrodes is used embodying electrode elements loosely mounted on the electrode supporting system, so as to rattle thereon on agitation of such system, the bumper means above described may be omitted as the agitation of the collecting or receiving electrode system by rotation of the unbalanced weight, as above described, will effect sufficient rattling and agitation of the loosely mounted electrode elements to cause removal of the deposited material therefrom without the operation of any bumper means.

The loosely mounted electrode elements, whether of high or low tension system, may extend in any desired direction, for example, horizontally, as shown in the drawing, or vertically, but in any case they will be mounted in a frame and will extend substantially in the plane of such frame.

What I claim is:

1. In an electrical precipitator, the combination with an electrode system, of means for yieldingly supporting the same, means for shaking the electrode system comprising an unbalanced weight rotatably mounted on the said electrode system to cause vibration of the electrode system by rotation of said weight, bumper means arranged for impact of the electrode system thereon in the vibrating movement thereof, and means for rotating said unbalanced weight.

2. In an electrical precipitator an electrode system, spring supporting means therefor, a shaft mounted to rotate on said electrode system, an unbalanced weight carried by said shaft, means for rotating said shaft, and bumper means for engaging said electrode system to jar the same in the vibratory movement thereof.

3. In an electrical precipitator a grounded electrode system comprising a plurality of vertically extending electrodes, spring supported suspension means for said electrodes, a rotatable shaft, a mounting for said shaft connected to the suspension means for the said electrodes, an unbalanced weight carried by said shaft and adapted to effect vibration of the suspension means and the collecting electrodes on rotation of said shaft, means for engaging the electrode system in its upward movement to cause jarring thereof in the vibration of said system.

4. In an electrical precipitator an electrode system comprising a frame and electrode elements loosely mounted at each end in said frame.

5. In an electrical precipitator an electrode frame comprising frame bars having openings and electrode elements consisting of bars extending in said openings and engaging loosely therein to permit rattling of the bars within the openings.

6. In an electrical precipitator a discharge electrode, insulator means, springs supported on said insulator means and resiliently supporting the discharge electrodes and means for acting upon the spring-supported end of the electrode to jar the same.

7. A construction as set forth in claim 6, in which the jarring means comprises a hammer and an impact-receiving means on the electrode.

8. In an electrical precipitator the combination of high tension discharge electrodes, insulator means, beams resting on said insulator means, springs supported by said beams, suspension means supported by said springs and connected to the discharge electrodes to support the same, impact receiving means rigidly connected to said suspension means and hammer devices adapted to strike said impact receiving means to jar the high tension discharge electrodes.

9. In an electrical precipitator, a resiliently mounted electrode frame, electrode members extending across said frame and loosely mounted at each end in the frame and hammer devices for jarring the frame.

10. In an electrical precipitator, the combination of supporting springs, an electrode frame carried by said springs, electrode members loosely mounted in said frame and hammer devices adapted to jar said frame.

11. In an electric precipitator, the combination of a collecting electrode system, spring means for supporting the system in normally balanced position and means for periodically acting upon the system to disturb the balanced relation.

12. In an electric precipitator, the combination of a collecting electrode system, spring means for supporting the system in normally balanced position, means for periodically acting upon the system to cause it to oscillate in the direction of the motion of the spring means and means in the path of oscillation for intercepting the movement of the system.

13. In an electric precipitator, a collecting electrode mounted for free vibration and means operative upon the electrode to effect continuous vibration thereof.

14. In an electric precipitator, a collecting electrode, means for mounting the electrode to give to it a short period of oscillation and means operative upon the electrode to effect continuous vibration thereof.

In testimony whereof I have hereunto subscribed my name this 30th day of March, 1921.

CHARLES H. WEISKOPF.